US008990130B2

(12) United States Patent
Alvarez-Icaza Rivera et al.

(10) Patent No.: US 8,990,130 B2
(45) Date of Patent: Mar. 24, 2015

(54) CONSOLIDATING MULTIPLE NEUROSYNAPTIC CORES INTO ONE MEMORY

(71) Applicant: International Business Machines Corporation, Armonk, NY (US)

(72) Inventors: Rodrigo Alvarez-Icaza Rivera, San Jose, CA (US); John V. Arthur, Mountain View, CA (US); Andrew S. Cassidy, San Jose, CA (US); Paul A. Merolla, Palo Alto, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 13/683,234

(22) Filed: Nov. 21, 2012

(65) Prior Publication Data
US 2014/0222740 A1 Aug. 7, 2014

(51) Int. Cl.
G06F 15/18 (2006.01)
G06E 1/00 (2006.01)
G06E 3/00 (2006.01)
G06G 7/00 (2006.01)
G06N 3/02 (2006.01)
(Continued)

(52) U.S. Cl.
CPC . *G06N 3/04* (2013.01); *G06N 3/063* (2013.01)
USPC .......................................................... 706/15

(58) Field of Classification Search
USPC .......................................................... 706/15
See application file for complete search history.

(56) References Cited

U.S. PATENT DOCUMENTS

| 5,701,397 A | 12/1997 | Steimle et al. |
| 5,819,245 A | 10/1998 | Peterson et al. |
| 6,999,953 B2 | 2/2006 | Ovhsinsky et al. |

(Continued)

FOREIGN PATENT DOCUMENTS

| CN | 101639901 A | 2/2011 |
| CN | 102193518 A | 9/2011 |

(Continued)

OTHER PUBLICATIONS

A Digital Neurosynaptic Core Using Event-Driven QDI Circuits Imam, N. ; Akopyan, F. ; Arthur, J. ; Merolla, P. ; Manohar, R. ; Modha, D.S. Asynchronous Circuits and Systems (ASYNC), 2012 18th IEEE International Symposium on DOI: 10.1109/ASYNC. 2012.12 Publication Year: 2012 , pp. 25-32.*

(Continued)

*Primary Examiner* — Michael B Holmes
(74) *Attorney, Agent, or Firm* — Sherman IP LLP; Kenneth L. Sherman; Hemavathy Perumal

(57) ABSTRACT

Embodiments of the invention relate to a neural network system comprising a single memory block for multiple neurosynaptic core modules. One embodiment comprises a neural network system including a memory array that maintains information for multiple neurosynaptic core modules. Each neurosynaptic core module comprises multiple neurons. The neural network system further comprises at least one logic circuit. Each logic circuit receives neuronal firing events targeting a neurosynaptic core module of the neural network system, and said logic circuit integrates the firing events received based on information maintained in said memory for said neurosynaptic core module.

25 Claims, 14 Drawing Sheets

(51) Int. Cl.
*G06N 3/04* (2006.01)
*G06N 3/063* (2006.01)

(56) References Cited

U.S. PATENT DOCUMENTS

| | | | |
|---|---|---|---|
| 7,043,466 B2 | 5/2006 | Watanabe et al. | |
| 7,457,787 B1 | 11/2008 | Furber | |
| 7,533,071 B2 | 5/2009 | Snook et al. | |
| 8,285,657 B2 | 10/2012 | Edelman et al. | |
| 8,606,732 B2 | 12/2013 | Venkatraman et al. | |
| 8,626,684 B2 * | 1/2014 | Modha | 706/16 |
| 8,655,813 B2 * | 2/2014 | Ananthanarayanan et al. | 706/25 |
| 8,682,822 B2 * | 3/2014 | Modha et al. | 706/25 |
| 8,699,566 B2 * | 4/2014 | Ananthanarayanan et al. | 375/240.01 |
| 8,712,940 B2 * | 4/2014 | Modha | 706/26 |
| 8,738,554 B2 * | 5/2014 | Modha | 706/25 |
| 8,799,199 B2 * | 8/2014 | Modha | 706/29 |
| 8,812,414 B2 * | 8/2014 | Arthur et al. | 706/15 |
| 8,812,415 B2 * | 8/2014 | Modha | 706/15 |
| 8,843,425 B2 * | 9/2014 | Modha | 706/25 |
| 8,856,055 B2 * | 10/2014 | Brezzo et al. | 706/33 |
| 8,868,477 B2 * | 10/2014 | Esser et al. | 706/26 |
| 8,874,498 B2 * | 10/2014 | Modha | 706/25 |
| 2010/0241601 A1 | 9/2010 | Carson et al. | |
| 2011/0161625 A1 | 6/2011 | Pechanek | |
| 2011/0167245 A1 | 7/2011 | Lavrov et al. | |
| 2013/0151793 A1 | 6/2013 | Rudosky et al. | |

FOREIGN PATENT DOCUMENTS

| | | |
|---|---|---|
| CN | 102663497 A | 9/2012 |
| JP | 6139217 A | 5/1994 |
| WO | 2012055593 A1 | 5/2012 |
| WO | 2013043903 A1 | 3/2013 |

OTHER PUBLICATIONS

The Parallel FDFM Processor Core Approach for Neural Networks Ago, Y.; Inoue, A.; Nakano, K.; Ito, Y. Networking and Computing (ICNC), 2011 Second International Conference on DOI: 10.1109/ICNC.2011.24 Publication Year: 2011, pp. 113-119.*

FPGA based pipelined architecture for action potential simulation in biological neural systems Pourhaj, P.; Teng, D.H.-Y. Electrical and Computer Engineering (CCECE), 2010 23rd Canadian Conference on DOI: 10.1109/CCECE.2010.5575160 Publication Year: 2010, pp. 1-4.*

Building block of a programmable neuromorphic substrate: A digital neurosynaptic core Arthur, J.V.; Merolla, P.A.; Akopyan, F.; Alvarez, R.; Cassidy, A.; Chandra, S.; Esser, S.K.; Imam, N.; Risk, W.; Rubin, D.B.D.; Manohar, R.; Modha, D.S. (IJCNN), The 2012 Intl Joint Conference on DOI: 10.1109/IJCNN.2012.6252 Pub Year: 2012, pp. 1-8.*

Strand, D., "OVONICS: From Science to Products," Journal of Optoelectronics and Advanced Materials, Aug. 2005, pp. 1679-1690, vol. 7, No. 4, JOAM, Romania.

Iyer, S.S. et al., "Embedded DRAM: Technology Platform for the Blue Gene/L Chip", IBM Journal of Research and Development, Mar. 2005, pp. 333-350, vol. 49, No. 2.3, IBM, USA.

Furber, S.B., "A Fascicle Impulse-Rate Encoded (FIRE) Neural Architecture", Oct. 2000, pp. 1-7, USA.

International Search Report and Written Opinion mailed Feb. 6, 2014 for International PCT Application No. PCT/IB2013/056734 from the State Intellectual Property Office, the P.R. China, pp. 1-10, Beijing, China.

Preissl, R. et al., "Compass: A scalable simulator for an architecture for Cognitive Computing", In the Proceedings of the 2012 International Conference on High Performance Computing, Networking, Storage and Analysis (SC) Article No. 54, Nov. 10-16, 2012, pp. 1-11, IEEE Xplore, United States.

International Search Report and Written Opinion mailed Jan. 2, 2014 for International PCT Application No. PCT/IBM2013/055312 from the State Intellectual Property Office, the P.R. China, pp. 107, Beijing, China.

Cattell, R. et al., "Challenges for Brain Emulation: Why is Building a Brain so Difficult?", Nat. Intell 1.3 (012) 17-31, Feb. 5, 2012, pp. 1-28, United States.

Imam, N. et al., "A Digital Neurosynaptic Core Using Event-Driven QDI Circuits", In the Proceedings of the 2012 IEEE 18th International Symposium on Asynchronous Circuits and Systems, May 7-9, 2012, pp. 25-32, IEEE Computer Society, United States.

Merolla, P. et al., "A Digital Neurosynaptic Core Using Embedded Crossbar Memory with 45pJ per Spike in 45nm", In the Proceedings of the 2011 Custom Integrated Circuits Conference (CICC), Sep. 19-21, 2011, pp. 1-4, IEEE Xplore, United States.

Patterson, C., "Scalable communications for a million-core neural processing architecture", Journal of Parallel and Distributed Computing, Feb. 4, 2012, pp. 1507-1520, vol. 72, Issue 11, Elsevier, United States.

* cited by examiner

| 614 | 610 | 611 | 612 |

| Information Regarding Neuron 0 in Core 0 | Information Regarding Neuron 0 in Core 1 | Information Regarding Neuron 0 in Core 2 |
| Information Regarding Neuron 1 in Core 0 | Information Regarding Neuron 1 in Core 1 | Information Regarding Neuron 1 in Core 2 |
| ... | ... | ... |
| Information Regarding Neuron N-1 in Core 0 | Information Regarding Neuron N-1 in Core 1 | Information Regarding Neuron N-1 in Core 2 |
| Information Regarding Neuron 0 in Core 3 | Information Regarding Neuron 0 in Core 4 | Information Regarding Neuron 0 in Core 5 |
| Information Regarding Neuron 1 in Core 3 | Information Regarding Neuron 1 in Core 4 | Information Regarding Neuron 1 in Core 5 |
| ... | ... | ... |
| Information Regarding Neuron N-1 in Core 3 | Information Regarding Neuron N-1 in Core 4 | Information Regarding Neuron N-1 in Core 5 |
| Information Regarding Neuron 0 in Core 6 | Information Regarding Neuron 0 in Core 7 | Information Regarding Neuron 0 in Core 8 |
| Information Regarding Neuron 1 in Core 6 | Information Regarding Neuron 1 in Core 7 | Information Regarding Neuron 1 in Core 8 |
| ... | ... | ... |
| Information Regarding Neuron N-1 in Core 6 | Information Regarding Neuron N-1 in Core 7 | Information Regarding Neuron N-1 in Core 8 |

FIG. 14

CONSOLIDATING MULTIPLE NEUROSYNAPTIC CORES INTO ONE MEMORY

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation and in particular, a neural network system comprising a single memory block for multiple neurosynaptic core modules.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

Embodiments of the invention relate to a neural network system comprising a single memory block for multiple neurosynaptic core modules. One embodiment comprises a neural network system including a memory array that maintains information for multiple neurosynaptic core modules. Each neurosynaptic core module comprises multiple neurons. The neural network system further comprises at least one logic circuit. Each logic circuit receives neuronal firing events targeting a neurosynaptic core module of the neural network system, and said logic circuit integrates the firing events received based on information maintained in said memory for said neurosynaptic core module.

Another embodiment comprises maintaining information for multiple neurosynaptic core modules in a memory array. Each neurosynaptic core module comprises multiple neurons. The neurosynaptic core modules are controlled using at least one logic circuit. Each logic circuit receives neuronal firing events targeting a neurosynaptic core module, and said logic circuit integrates the firing events received based on information maintained in said memory for said neurosynaptic core module.

These and other features, aspects and advantages of the present invention will become understood with reference to the following description, appended claims and accompanying figures.

BRIEF DESCRIPTION OF THE SEVERAL VIEWS OF THE DRAWINGS

FIG. 14 is a block diagram showing a memory array of a meta-core, in accordance with an embodiment of the invention;

DETAILED DESCRIPTION

Figure 1:
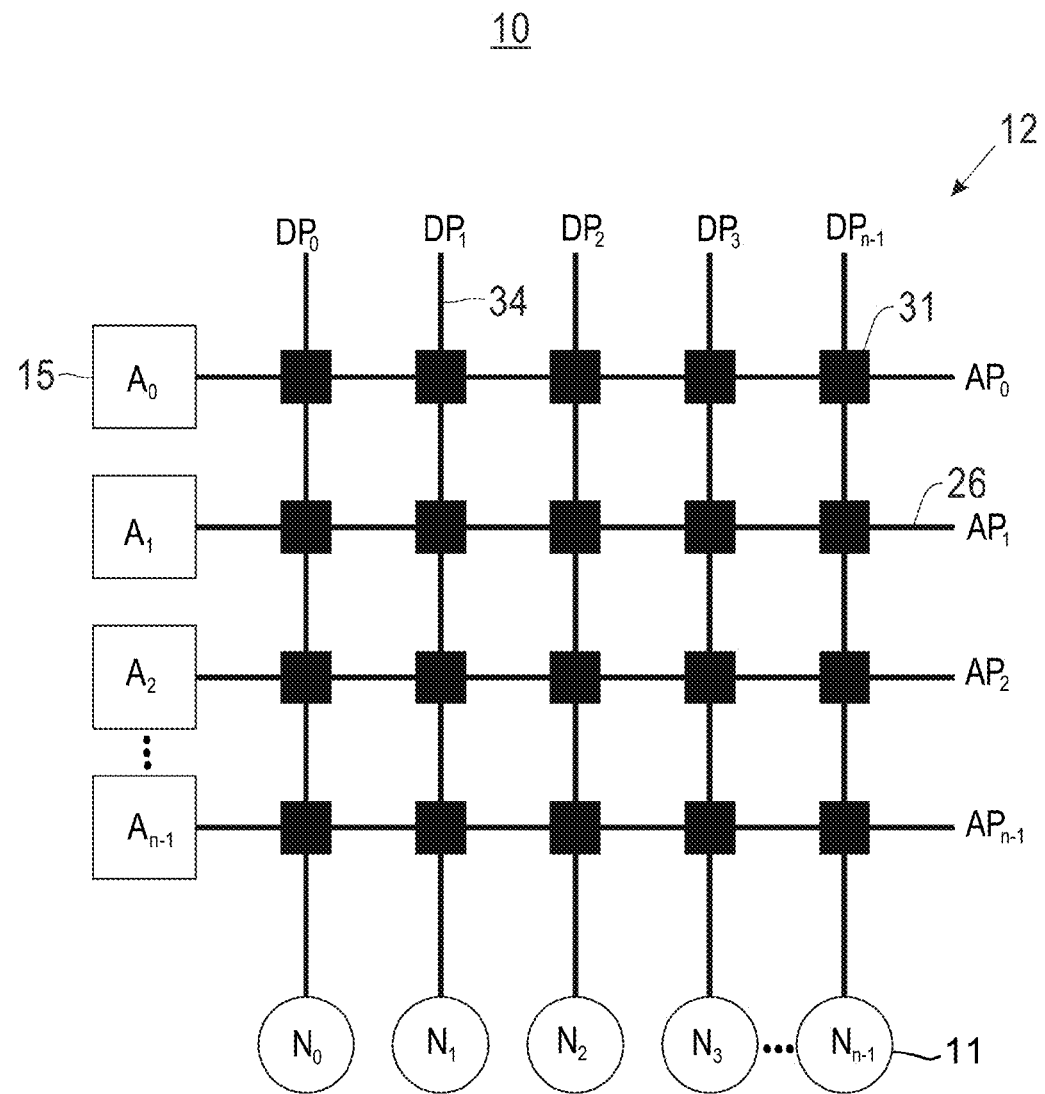
FIG. 1 illustrates a neurosynaptic core module, in accordance with an embodiment of the invention.

Embodiments of the invention relate to a neural network system comprising a single memory block for multiple neurosynaptic core modules. One embodiment comprises a neural network system including a memory array that maintains information for multiple neurosynaptic core modules. Each neurosynaptic core module comprises multiple neurons. The neural network system further comprises at least one logic circuit. Each logic circuit receives neuronal firing events targeting a neurosynaptic core module of the neural network system, and said logic circuit integrates the firing events received based on information maintained in said memory for said neurosynaptic core module.

Another embodiment comprises maintaining information for multiple neurosynaptic core modules in a memory array. Each neurosynaptic core module comprises multiple neurons. The neurosynaptic core modules are controlled using at least one logic circuit. Each logic circuit receives neuronal firing events targeting a neurosynaptic core module, and said logic circuit integrates the firing events received based on information maintained in said memory for said neurosynaptic core module.

The memory array is organized into multiple subsets. Each subset corresponds to a neurosynaptic core module of the neural network system. Each subset maintains neuronal attributes for neurons of a corresponding neurosynaptic core module.

Each subset is divided into multiple entries. Each entry maintains neuronal attributes for a corresponding neuron. For each entry, the neuronal attributes maintained in said entry includes synaptic connectivity information, neuron parameters, and routing data information for a corresponding neuron.

Each logic circuit corresponds to one or more neurosynaptic core modules of the neural network system. Each logic circuit receives incoming neuronal firing events targeting a neuron of said one or more neurosynaptic core modules, retrieves neuron attributes for said neuron from a corresponding entry of said memory array, integrates the firing events received based on the neuron attributes for said neuron, generates an outgoing neuronal firing event when the integrated firing events exceed a threshold neuron parameter for said neuron, and updates at least one neuron attribute for said neuron.

In one embodiment, each logic circuit multiplexes computation and control logic for at least two neurosynaptic core modules.

The memory array has multiple rows. Each row includes at least one entry. For each time step, the rows of the memory array are read out sequentially. In one embodiment, each row maintains neuronal attributes for neurons of different neurosynaptic core modules.

In one embodiment, said memory array is scaled in width. In another embodiment, said memory array is scaled in height.

The term digital neuron as used herein represents an framework configured to simulate a biological neuron. An digital neuron creates connections between processing elements that are roughly functionally equivalent to neurons of a biological brain. As such, a neuromorphic and synaptronic computation comprising digital neurons, according to embodiments of the invention, may include various electronic circuits that are modeled on biological neurons. Further, a neuromorphic and synaptronic computation comprising digital neurons, according to embodiments of the invention, may include various processing elements (including computer simulations) that are modeled on biological neurons. Although certain illustrative embodiments of the invention are described herein using digital neurons comprising digital circuits, the present invention is not limited to digital circuits. A neuromorphic and synaptronic computation, according to embodiments of the invention, can be implemented as a neuromorphic and synaptronic framework comprising circuitry and additionally as a computer simulation. Indeed, embodiments of the invention can take the form of an entirely hardware embodiment, an entirely software embodiment, or an embodiment containing both hardware and software elements.

FIG. 1 illustrates a neurosynaptic core module ("core") 10, in accordance with an embodiment of the invention. A neurosynaptic core module 10 is a neurosynaptic/neural core circuit. The core 10 comprises multiple pre-synaptic axons 15, such as axons $A_0, A_1, A_2, \ldots,$ and $A_{n-1}$. The core 10 further comprises multiple post-synaptic neurons 11, such as neurons $N_0, N_1, N_2, \ldots,$ and $N_{n-1}$. Each neuron 11 has configurable operational parameters. The core 10 further comprises a synaptic crossbar 12 including multiple synapses 31, multiple rows/axon paths 26, and multiple columns/dendrite paths 34.

Each synapse 31 gates firing events (e.g., spike events) traveling from pre-synaptic axon 15 to post-synaptic neurons 11. Each axon 15 is connected to a corresponding axon path 26 of the crossbar 12. For example, axon $A_0$ sends spike events ("spikes") to a corresponding axon path $AP_0$. Each neuron 11 is connected to a corresponding dendrite path 34 of the crossbar 12. For example, neuron $N_0$ receives spike events from a corresponding dendrite path $DP_0$. Each synapse 31 is located at an intersection between an axon path 26 and a dendrite path 34.

Each synapse 31 has a synaptic weight. The synaptic weights of the synapses 31 of the core 10 may be represented by a weight matrix W, wherein an element $W_{ij}$ of the matrix W represents a synaptic weight of a synapse 31 located at a row/axon path i and a column/dendrite path j of the crossbar 12. In one embodiment, the synapses 31 are binary memory devices. Each synapse 31 can have either a weight "0" or a weight "1". In one embodiment, a synapse 31 with a weight "0" indicates that said synapse 31 is non-conducting. In another embodiment, a synapse 31 with a weight "0" indicates that said synapse 31 is not connected. In one embodiment, a synapse 31 with a weight "1" indicates that said synapse 31 is conducting. In another embodiment, a synapse 31 with a weight "1" indicates that said synapse 31 is connected. A learning rule such as spike-timing dependent plasticity (STDP) may be applied to update the synaptic weights of the synapses 31.

Figure 2:
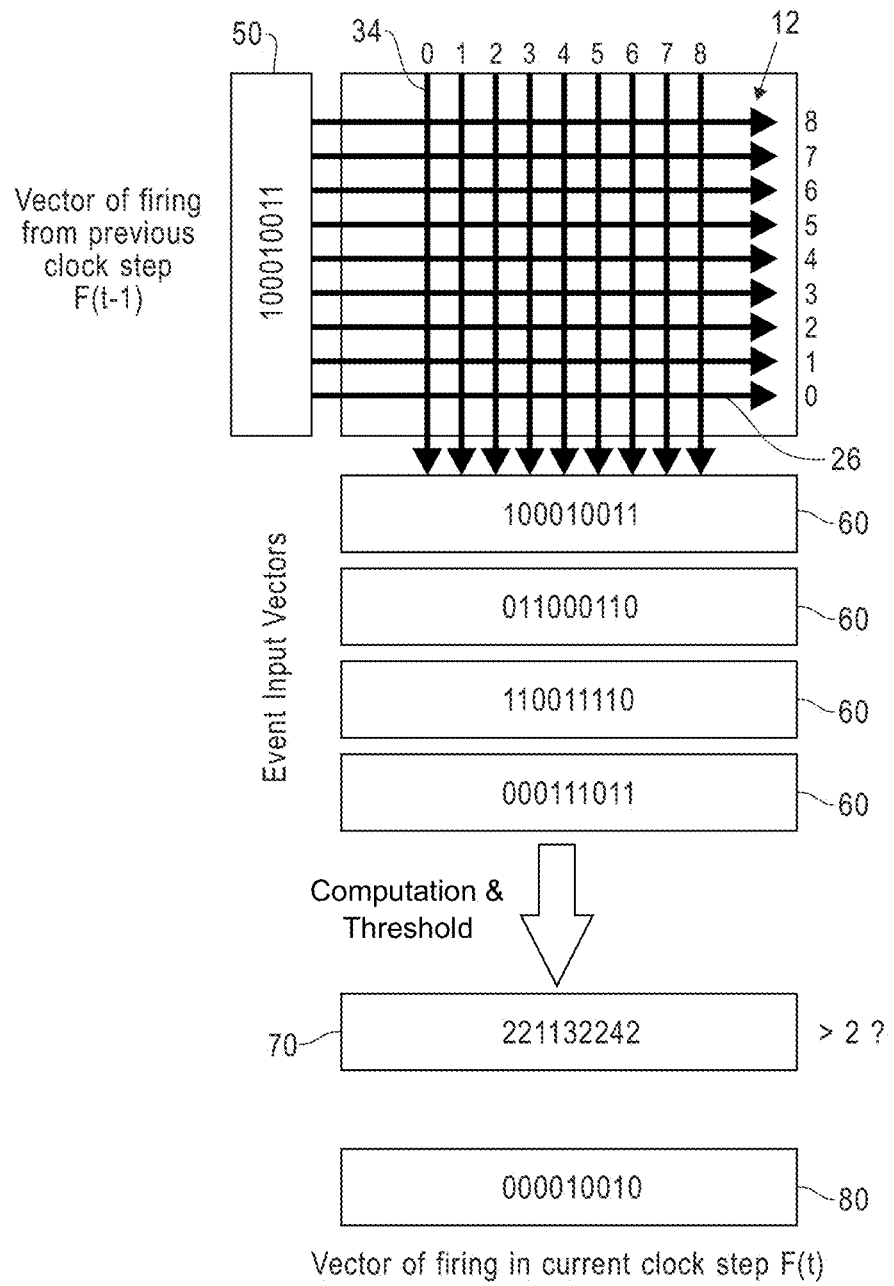
FIG. 2 illustrates the operation of a neurosynaptic core module upon receiving an input vector of firing events, in accordance with an embodiment of the invention.

FIG. 2 illustrates the operation of a core 10 upon receiving an input vector 50 of firing events, in accordance with an embodiment of the invention. At every time step t, the axons 15 of the core 10 receive a binary input vector ("input vector") 50 of firing events, wherein the input vector 50 indicates the axons 15 that have received firing events generated in a previous clock step t−1 by neurons 11. Specifically, each index in the input vector 50 is associated with an axon 15 of the crossbar 12. Each index with a binary value of 1 indicates that the corresponding axon 15 received a firing event.

For every index with a binary value of 1 in an input vector 50, the weight of the synapses 31 located at the axon path/row 26 of the corresponding axon 15 is read out to obtain a binary output vector ("output vector") 60. Each index in an output vector 60 corresponding to an axon path/row 26 is associated with a synapse 31 of the crossbar 12. Specifically, each index with a binary value of 1 indicates that a corresponding synapse 31 is a conducting synapse 31. Each index with a binary value of 0 indicates that a corresponding synapse 31 is a non-conducting synapse 31.

For example, as shown in FIG. 2, at time step F(t), the axons 15 receive an input vector 50 with values <1, 0, 0, 0, 1, 0, 0, 1, 1>. The values <1, 0, 0, 0, 1, 0, 0, 1, 1> indicate that the axons 15 connected to axon paths/rows 0, 4, 7, and 8 of the crossbar 12 received firing events generated in a previous clock step F(t−1) by neurons 11. The weight of the synapses 31 located at each axon path/row 0, 4, 7, and 8 are read out during the time step F(t). The output vectors 60 corresponding to rows 0, 4, 7, and 8 are <1, 0, 0, 0, 1, 0, 0, 1, 1>, <0, 1, 1, 0, 0, 0, 1, 1, 0>, <1, 1, 0, 0, 1, 1, 1, 1, 0>, and <0, 0, 0, 1, 1, 1, 0, 1, 1>, respectively.

As stated above, each index with a binary value of 1 in an output vector 60 indicates a conducting synapse 31. For each conducting synapse 31, said conducting synapse 31 transmits a firing event from a connected axon 15 to a connected neuron 11. For each neuron 11, the number of firing events received is integrated into a membrane potential variable V of said neuron 11. For example, in FIG. 2, a sequence of numbers 70 is provided, wherein each number in the sequence 70 corresponds to a neuron 11 of the core 10. Each number in the sequence 70 indicates the number of firing events a corresponding neuron 11 received in the current time step t. Neurons 11 connected to dendrite paths/columns 0, 1, 2, ..., and 8 of the crossbar 12 received two firing events, two firing events, one firing event, one firing event, three firing events, two firing events, two firing events, four firing events, and two firing events, respectively.

For each neuron 11, a firing event is generated if the number of firing events integrated by said neuron 11 in the current time step t exceeds a firing threshold of said neuron 11. After each neuron 11 determines whether a spiking threshold of said neuron 11 is exceeded, a binary update vector 80 is generated. Each index in the update vector 80 corresponds to a neuron 11 of the crossbar 12. Specifically, each index with a binary value of 1 indicates that a corresponding neuron 11 generated a firing event in the current time step t in response to integrated firing events exceeding a spiking threshold of the neuron 11.

For example, each neuron 11 in the core 10 may have a spiking threshold equal to two. As shown in FIG. 2, a binary update vector 80 generated in the current time step F(t) indicates that neurons 11 connected to dendrite paths/columns 4 and 7 of the crossbar 12 generated a firing event in the current time step F(t).

In one embodiment, a neurosynaptic core module comprising N neurons further comprises a processing and computation logic circuits for the N neurons, wherein $\alpha$ is a positive integer and $1 \le \alpha < N$, and the neurons are digital neurons.

Figure 3:
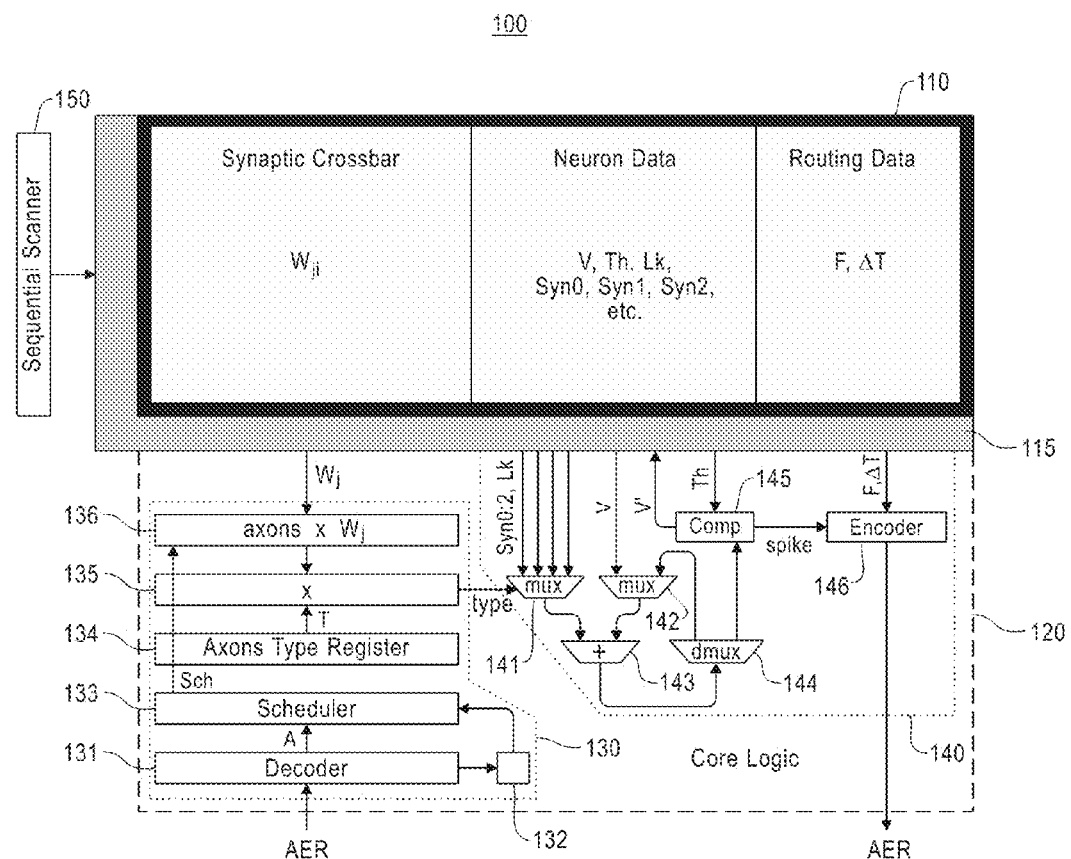
FIG. 3 illustrates a multiplexed neural core circuit, in accordance with an embodiment of the invention.
Figure 4:
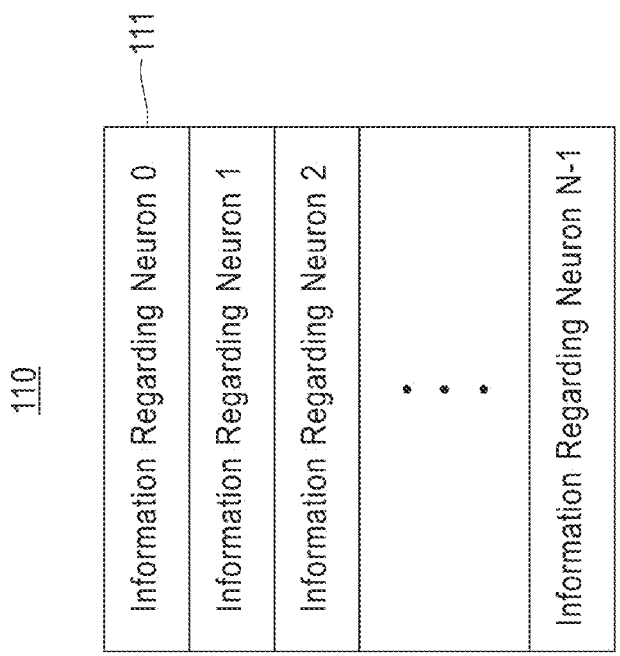
FIG. 4 is a block diagram showing a memory array of a multiplexed core, in accordance with an embodiment of the invention.

FIG. 3 illustrates a multiplexed neural core circuit 100, in accordance with an embodiment of the invention. The core 100 is multiplexed because it comprises a single memory array 110 maintaining neuronal attributes for multiple neurons 11. The memory array 110 includes multiple entries 111 (FIG. 4). Each entry 111 maintains neuronal attributes for a neuron 11.

Specifically, each entry 111 maintains the following neuronal attributes for a neuron 11: synaptic connectivity information, neuron parameters, and routing information. Each entry 111 (FIG. 5) may maintain additional neuronal attributes for a neuron 11. In one embodiment, a first subset 112 (FIG. 5) of each entry 111 maintains synaptic weights of synapses 31 interconnecting a neuron 11 to axons 15. A second subset 113 (FIG. 5) of each entry 111 maintains the following neuron parameters for a neuron 11: membrane potential variable (V), spike threshold (Th), leak rate (Lk), and synaptic weights of each possible axon type (Syn0, Syn1, Syn2). The second subset 113 may maintain additional neuronal attributes for a neuron 11. A third subset 114 (FIG. 5) of each entry 111 further maintains the following routing information for a neuron 11: the destination/target axon 15 for the neuron 11 (F), and routing delay ($\Delta$T).

The memory array 110 further includes a memory interface circuit 115. The circuit 115 may be a standard memory interface circuit.

The core 100 further comprises a processing and computation logic circuit 120 for the memory array 110.

In one embodiment, the circuit 120 comprises an input processing fabric 130 and a computation fabric 140. For each entry 111, the processing fabric 130 is configured to receive and process firing events targeting said entry 111. Specifically, each firing event received targets an axon 15 that a neuron 11 represented by said entry 111 is interconnected to. As indicated above, a first subset 112 of each entry 111 maintains synaptic weights of synapses 31 interconnecting a neuron 11 to axons 15. If the synapse 31 interconnecting the targeted axon 15 and the neuron 11 represented by said entry 111 is conducting, said firing event may be integrated by the computation fabric 140.

In one embodiment, the processing fabric 130 comprises a decoder 131, a scheduler control unit 132, a scheduler 133, an axon type register 134, a controller 135, and a dot product module 136.

In a neural network comprising multiple cores 100, firing events are routed between cores 100 of the neural network in the form of address-event packets. Each address-event packet includes a firing event encoded as a binary address representing a target axon 15, wherein the firing event was generated by a neuron 11 in the same core 100 or a different core 100. Each address-event packet further includes a time stamp indicating when a firing event encapsulated in said address-event packet was generated. The decoder 131 of each core 100 is configured for receiving and decoding address-event packets.

The scheduler 135 buffers incoming events and queues the events for delivery. In one example implementation, the scheduler 133 is a dual port memory including rows and columns. Firing events decoded from received address-event packets are stored in the scheduler 133, wherein rows represent future time steps and columns represent axons 15. For each firing event, the scheduler control unit 132 controls which row and column of the scheduler 133 that the firing event is written to. A delay is selectively imposed on received firing events before transmitting them to target axons 15. For each firing event, the scheduler control unit 132 computes the length of time said firing event has spent on route to the decoder 131 as the difference d between the arrival time of the address-event packet at the decoder 131 and the time stamp indicating when the firing event was generated. If the difference d is less than a predetermined delivery delay (or predetermined total delay) n, the firing event is held in the scheduler 133 for a delay period D equal to the difference between n and d to achieve n timestamps from firing event generation to firing event delivery, and the scheduler 133 delivers the firing event at the end of the delay period.

For example, if a spike requires between 3 and 9 time steps to propagate in a neural network, the scheduler 133 ensures 9 time steps for all spikes. In one example, even if a spike arrives at the decoder 131 within 3 time steps from generation, the scheduler 133 delays transmission of that spike by 6 time steps such that the spike is transmitted from the scheduler 133 at the end of 9 time steps from spike generation.

At the beginning of each time step, a vector indicating all active axons 15 in the current time step is read from the scheduler 133 as a row. The entire memory array 110 is then read and written once per time step.

Specifically, for each time step, entries 111 of the memory array 110 are sequentially read out one at a time using a sequential scanner 150. The controller 135 is configured to generate clock signals. The controller 135 is further configured to send control signals to the memory array 110. For each entry 111 representing a neuron 11, the dot product module 136 computes the dot product between the vector of active axons 15 in the current time step and the synaptic connectivity information maintained in said entry 111, i.e., the synaptic weights of all synapses 31 that the dendrite path 34 of the neuron 11 is connected to (Wj). The controller 135 is further configured to combine the dot product computed and the firing events to create signals and commands to send to the computation fabric 140. Axon type register 134 may be used to generate instructions for a neuron 11. For example, the instructions generated may indicate which of the four synaptic weights (i.e., Syn0, Syn1, Syn2, or Syn3) a neuron 11 should use.

In one embodiment, the computation fabric 140 comprises a first multiplexer 141, a second multiplexer 142, an adder 143, a demultiplexer 144, a comparator module ("comparator") 145, and an encoder 146. For each entry 111, the first multiplexer 141 uses information provided by the multiplexing control unit 135 to select a neuron parameter (i.e., Syn0, Syn1, Syn2, Lk). For example, the leak rate Lk maintained in said entry 111 is selected after all spikes are integrated. The adder 143 adds the neuron parameter selected by the first multiplexer 141 to a membrane potential variable selected by the second multiplexer 142. For each entry 111, the second multiplexer 142 selects the membrane potential variable V maintained in said entry 111 for the first addition. For each entry 111, the second multiplexer 142 selects a modified membrane potential variable for subsequent additions, wherein the modified membrane potential variable is a temporary variable.

For each entry 111, after all spikes are integrated and the leak rate is applied, the comparator 145 determines whether the modified membrane potential variable exceeds a threshold parameter Th maintained in said entry 111. If the threshold parameter Th is exceeded, the encoder 146 generates a spike and uses the routing delay ΔT information maintained in said entry 111 to encapsulate/encode the generated spike into an address-event packet for delivery to the destination/target axon 15 identified by F. The membrane potential variable V may be reset to zero before it is written back to said entry 111.

Table 1 below provides example pseudo code, demonstrating the execution of the circuit 120.

TABLE 1

```
for i=0 to NumAxonEvents-1
    write A(i) to scheduler
read Sch(t,:)
for j=0 to 255
    read W(j,:), V(j), Th(j), Lk(j), Syn(j,:)
    for i=0 to 255
        if Sch(t,i)==1 and W(j,i)==1
            V(j) += Syn( j,T(i) )
    V(j) += Lk(j)
    if V(j) >Th(j)
        V(j) = 0 ; Send Spike j
    write V(j)
```

FIG. 4 is a block diagram showing a memory array 110 of a multiplexed core 100, in accordance with an embodiment of the invention. As stated above, the memory array 110 maintains information relating to multiple neurons 11. The memory array 110 includes multiple entries 111. Each entry 111 maintains neuronal attributes for a neuron 11.

Figure 5:
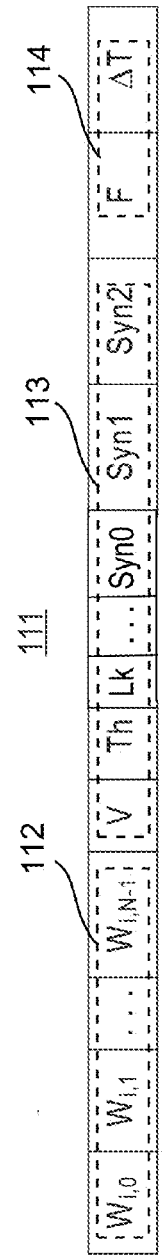
FIG. 5 is a block diagram showing information maintained within an entry of a memory array of a multiplexed core, in accordance with an embodiment of the invention.

FIG. 5 is a block diagram showing information maintained within an entry 111 of a memory array 110 of a multiplexed core 100, in accordance with an embodiment of the invention. In one embodiment, each entry 111 maintains the following neuronal attributes for a neuron 11: synaptic connectivity information, neuron parameters, and routing information. In one embodiment, a first subset 112 of each entry 111 maintains synaptic weights of synapses 31 interconnecting a neuron 11 to axons 15. A second subset 113 of each entry 111 maintains the following neuron parameters for a neuron 11: membrane potential variable (V), spike threshold (Th), leak rate (Lk), and weights of each possible axon type (Syn0, Syn1, Syn2). A third subset 114 of each entry 111 further maintains the following routing information for a neuron 11: the destination/target axon 15 for the neuron 11 (F), and routing delay (ΔT).

Figure 6:
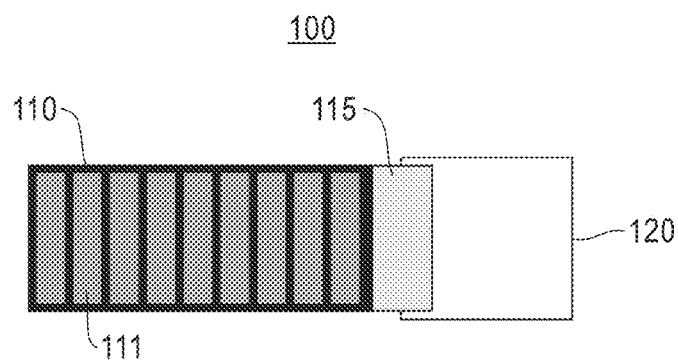
FIG. 6 is a block diagram showing a multiplexed core, in accordance with an embodiment of the invention.

FIG. 6 is a block diagram showing a multiplexed core 100, in accordance with an embodiment of the invention. As stated above, the core 100 comprises a memory array 110 including multiple entries 111. Each entry 111 maintains information pertaining to a neuron 11. The core 100 further comprises one processing and computation logic circuit 120 for all neurons 11. A memory interface circuit 115 bridges the memory array 110 with the circuit 120.

Figure 7:
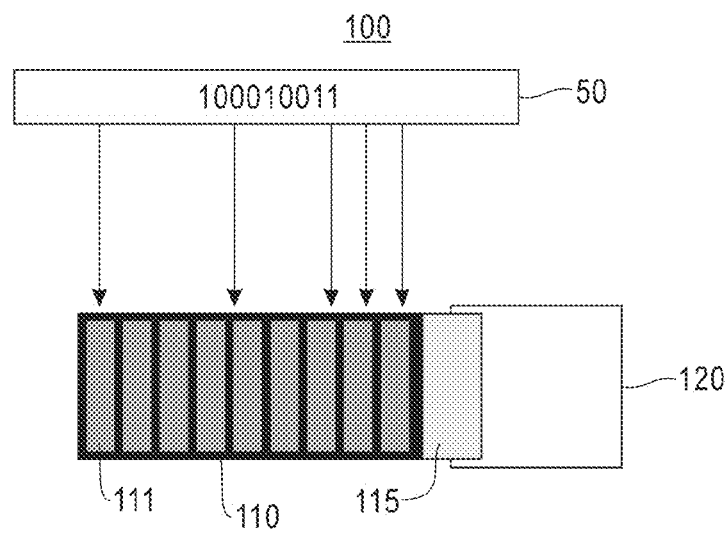
FIG. 7 is a block diagram showing a multiplexed core receiving a binary input vector, in accordance with an embodiment of the invention.

FIG. 7 is a block diagram showing a multiplexed core 100 receiving a binary input vector 50, in accordance with an embodiment of the invention. As stated above, at the beginning of each time step, a binary input vector 50 indicating all active axons 15 in the current time step is obtained from the scheduler 133. Each entry 111 of the memory array 110 is then sequentially read out one at a time.

Figure 8:
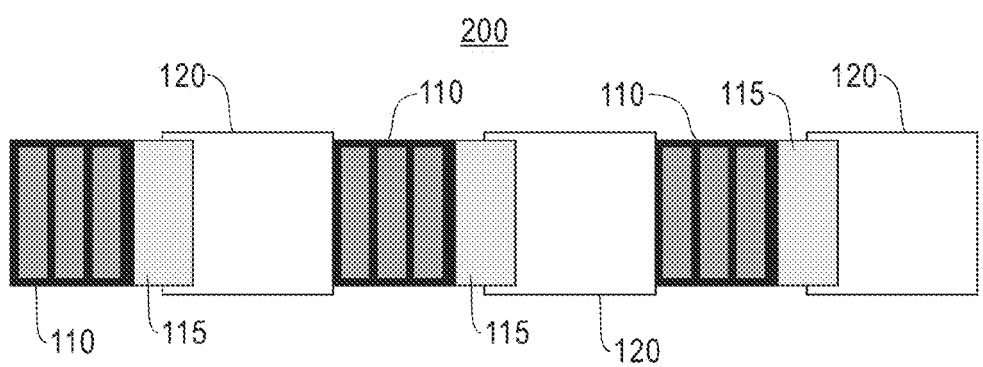
FIG. 8 is a block diagram showing a semi-multiplexed core, in accordance with an embodiment of the invention.

FIG. 8 is a block diagram showing a semi-multiplexed core 200, in accordance with an embodiment of the invention. The core 200 comprises multiple memory arrays 110. Each memory array 110 has a corresponding processing and computation logic circuit 120. In one embodiment, a core 200 comprising N neurons may comprise a processing and computation logic circuits for the N neurons, wherein α is a positive integer and $1 \le \alpha < N$.

Figure 9:
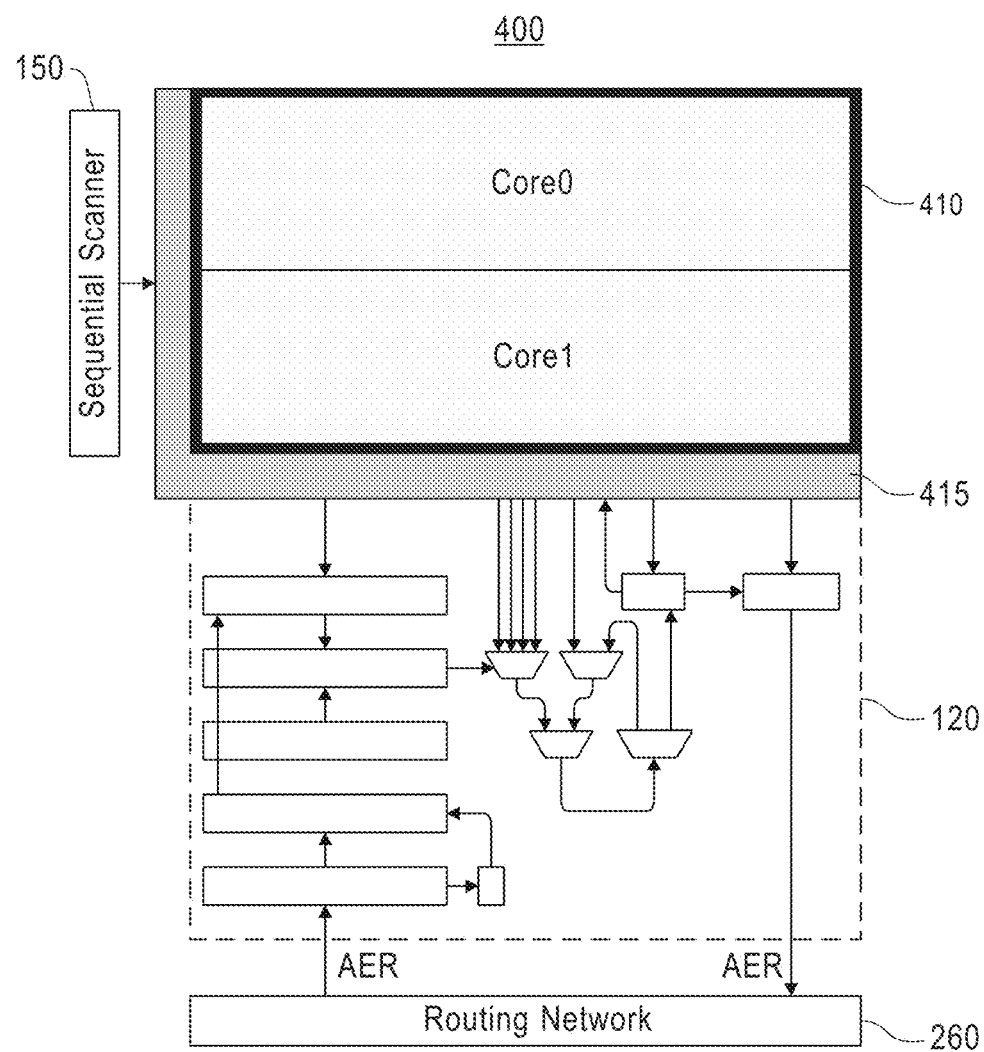
FIG. 9 illustrates a tall meta-core, in accordance with an embodiment of the invention.

FIG. 9 illustrates a tall meta-core 400, in accordance with an embodiment of the invention. The core 400 comprises a tall memory array 410 maintaining neuronal attributes for multiple neurons 11 belonging to different cores 10. The memory array 410 includes multiple subsets 412 (FIG. 10), wherein each subset 412 maintains neuronal attributes for neurons 11 of a core 10. Each subset 412 includes multiple entries 411, wherein each entry 411 maintains neuronal attributes for a neuron 11. For each entry 411, the neuronal attributes for a neuron 11 includes synaptic connectivity information, neuron parameters, and routing information.

The core 400 further comprises a processing and computation logic circuit 120. The neurons 11 represented by the memory array 410 are multiplexed, such that each neuron 11 represented by a entry 411 of the memory array 110 shares the circuit 120 with other neurons 11 represented by other entries 411 of the memory array 410. As such, neurons 11 of different cores 10 share the same circuit 120. A memory interface circuit 415 bridges the memory array 410 with the circuit 120.

The decoder 131 of the circuit 120 is configured to receive address-event packets from a routing network 260. The encoder 146 of the circuit 120 is configured to send address-event packets to the routing network 260.

Consolidating data into a tall memory array 410 reduces passive power consumption without increasing the overall active power consumption. A memory array that is scaled in height, such as the tall memory array 410, requires a faster clock. For example, the speed of a clock for the tall memory array 410 increases in proportion with the number of entries 411 (e.g., rows) within the tall memory array 410.

Figure 10:
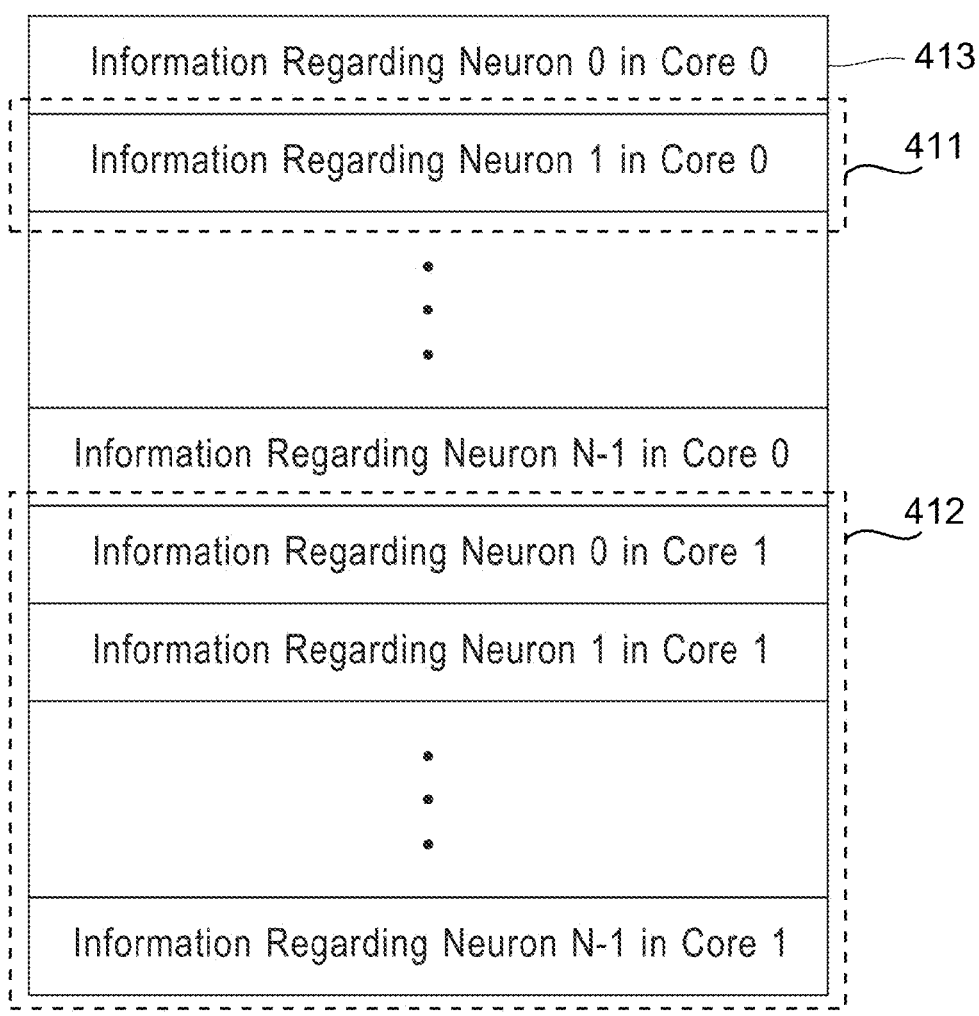
FIG. 10 is a block diagram showing a tall memory array of a tall meta-core, in accordance with an embodiment of the invention.

FIG. 10 is a block diagram showing a tall memory array 410 of a tall meta-core 400, in accordance with an embodiment of the invention. As stated above, the tall memory array 410 maintains neuronal attributes for multiple neurons 11 belonging to different cores 10. The memory array 410 includes multiple subsets 412, wherein each subset 412 maintains neuronal attributes for neurons 11 of a core 10. Each subset 412 includes multiple entries 411, wherein each entry 411 maintains neuronal attributes for a neuron 11. For each entry 411, the neuronal attributes for a neuron 11 includes synaptic connectivity information, neuron parameters, and routing information.

As shown in FIG. 10, the tall memory array 410 has multiple rows 413. Each entry 411 is a row 413 of the tall memory array 410. Therefore, each row 413 maintains neuronal attributes for a corresponding neuron 11. The rows 413 of the tall memory array 410 are sequentially read out one at a time.

Figure 11:
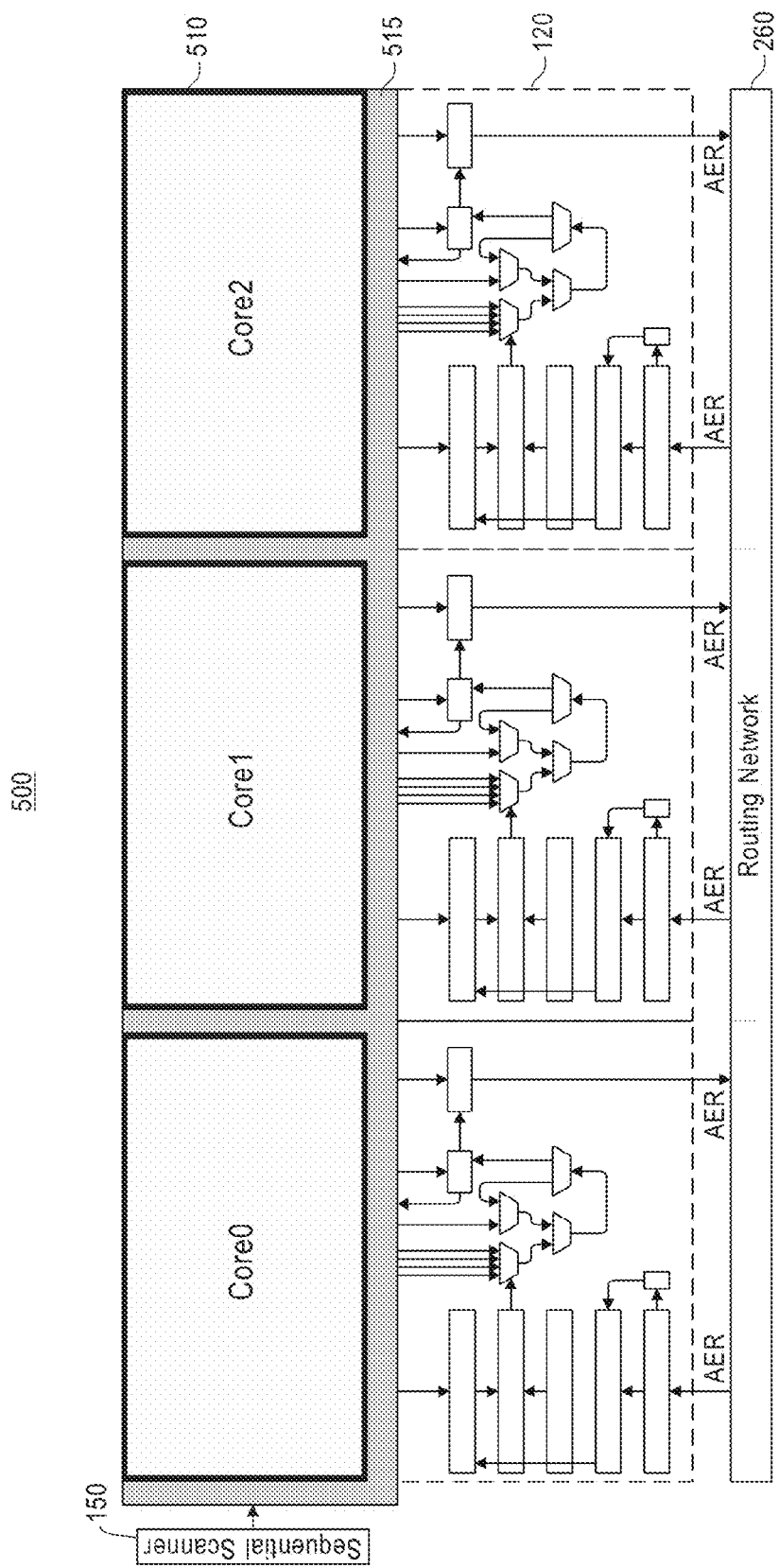
FIG. 11 illustrates a wide meta-core, in accordance with an embodiment of the invention.

FIG. 11 illustrates a wide meta-core 500, in accordance with an embodiment of the invention. The core 500 comprises a wide memory array 510 maintaining neuronal attributes for multiple neurons 11 belong to different cores 10. The memory array 510 includes multiple subsets 512 (FIG. 12), wherein each subset 512 of the memory array 510 maintains neuronal attributes of neurons 11 of a core 10. Each subset 512 may be divided into multiple entries 511, wherein each entry 511 maintains neuronal attributes for a neuron 11. In one example implementation, the number of entries 511 each subset 512 comprises is equal to the number of cores 10 that the memory array 510 represents. For each entry 511, the neuronal attributes for a neuron 11 maintained in said entry 511 includes synaptic connectivity information, neuron parameters, and routing information.

The core 500 further comprises multiple processing and computation logic circuits 120. In one embodiment, a core 500 comprising N neurons may comprise α processing and computation logic circuits 120 for the N neurons, wherein α is a positive integer and $1 \leq \alpha < N$. In one example implementation, each subset 512 that the memory array 510 has a corresponding processing and computation logic circuit 120. As such, neurons 11 of the same core 10 share the same circuit 120. During operation, each entry 511 of each subset 512 is read out fully, and neuronal attributes of said entry 511 is independently processed by the circuit 120 of said subset 512. A memory interface circuit 515 bridges the memory array 510 with the circuit 120.

Consolidating data into a wide memory array 510 reduces passive power consumption. A memory array that is scaled in width, such as the wide memory array 510, does not increase temporal requirements (i.e., the number of entries 511/rows remains the same) and does not require a faster clock.

Figure 12:
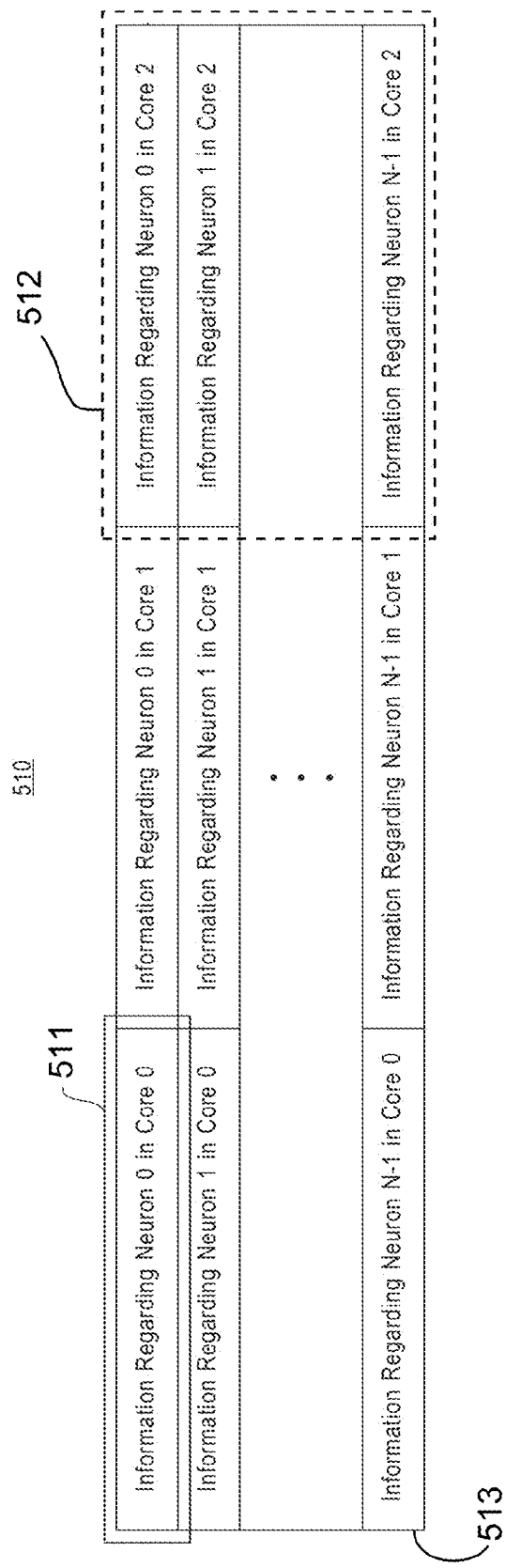
FIG. 12 is a block diagram showing a wide memory array of a wide meta-core, in accordance with an embodiment of the invention.

FIG. 12 is a block diagram showing a wide memory array 510 of a wide meta-core 500, in accordance with an embodiment of the invention. As stated above, the wide memory array 510 maintains neuronal attributes for multiple neurons 11 belonging to different cores 10. The memory array 510 includes multiple subsets 512, wherein each subset 512 of the memory array 510 maintains neuronal attributes of neurons 11 of a core 10. Each subset 512 may be divided into multiple entries 511, wherein each entry 511 maintains neuronal attributes for a neuron 11. In one example implementation, the number of entries 511 each subset 512 comprises is equal to the number of cores 10 that the memory array 510 represents. For each entry 511, the neuronal attributes for a neuron 11 maintained in said entry 511 include synaptic connectivity information, neuron parameters, and routing information.

As shown in FIG. 12, the wide memory array 510 has multiple rows 513. Each row 513 includes multiple entries 511 of different subsets 512. Therefore, each row 513 maintains neuronal attributes for neurons 11 of different cores 10. The rows 513 of the wide memory array 510 are sequentially read out one at a time, and data corresponding to each core 10 is independently processed by the logic circuit 120 corresponding to said core 10.

Figure 13:
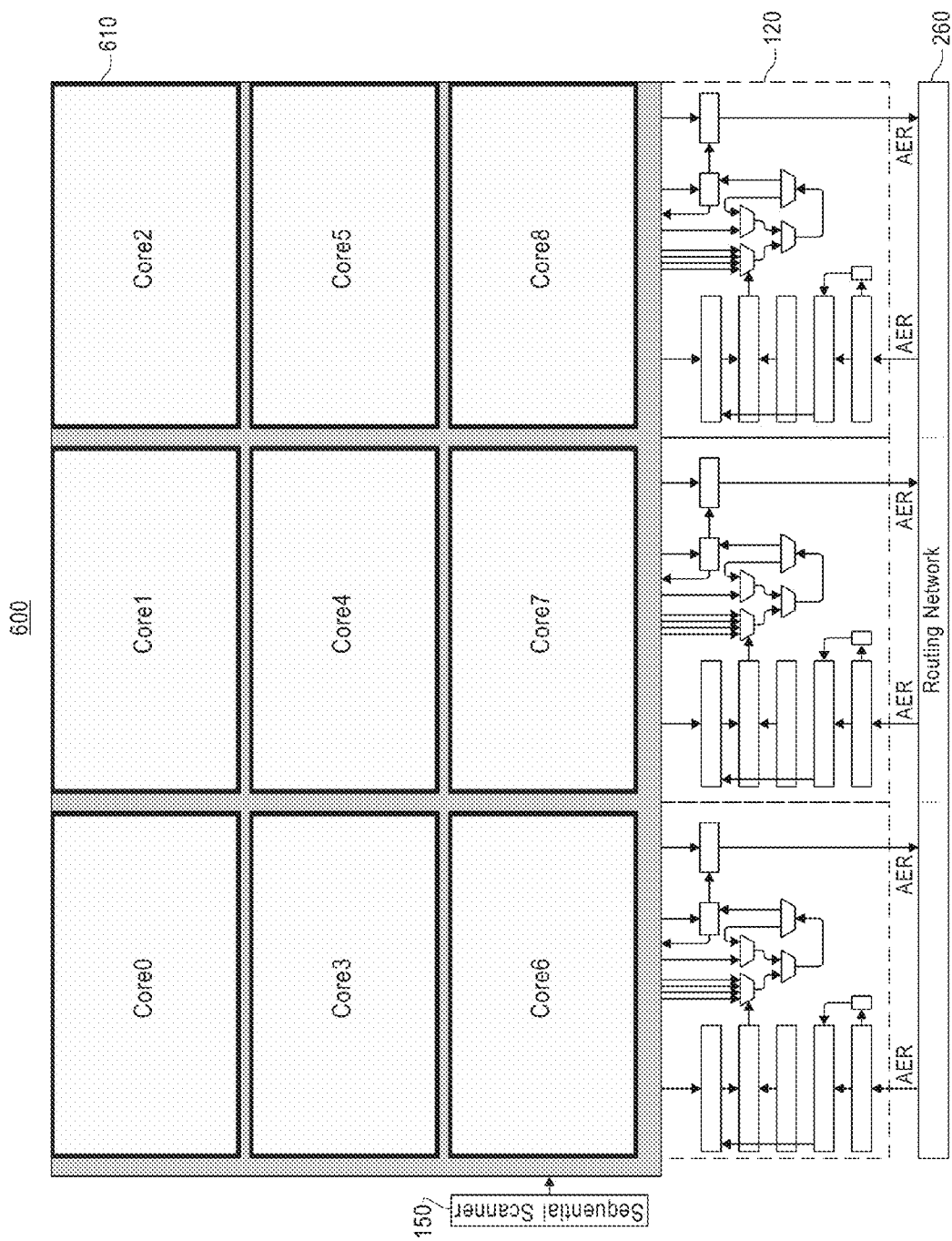
FIG. 13 illustrates a meta-core, in accordance with an embodiment of the invention.

FIG. 13 illustrates a meta-core 600, in accordance with an embodiment of the invention. The core 600 comprises a memory array 610 maintaining neuronal attributes for multiple neurons 11 belonging to different cores 10. The memory array 610 includes multiple subsets 612 (FIG. 14), wherein each subset 612 of the memory array 610 maintains neuronal attributes of neurons 11 of a core 10. Each subset 612 may be divided into multiple entries 611 (FIG. 14), wherein each entry 611 maintains neuronal attributes for a neuron 11. For each entry 611, the neuronal attributes maintained in said entry 611 includes synaptic connectivity information, neuron parameters, and routing information.

Consolidating data into a memory array 610 reduces passive power consumption. The core 600 further comprises multiple processing and computation logic circuits 120. In one embodiment, a core 600 comprising N neurons may comprise a processing and computation logic circuits 120 for the N neurons, wherein α is a positive integer and $1 \leq \alpha < N$. In one example implementation, the subsets 612 are organized into multiple groups 614 (FIG. 14), wherein each group 614 comprises multiple subsets 612 representing different cores 10. Each group 614 has a corresponding processing and computation logic circuit 120. As such, neurons 11 of the same group 614 share the same circuit 120. During operation, each entry 611 of each subset 612 of each group 614 is read out fully, and neuronal attributes of said entry 611 is independently processed by the circuit 120 of said group 614.

FIG. 14 is a block diagram showing a memory array 610 of a meta-core 600, in accordance with an embodiment of the invention. As stated above, the memory array 610 maintains neuronal attributes for multiple neurons 11 belonging to different cores 10. The memory array 610 includes multiple subsets 612, wherein each subset 612 of the memory array 612 maintains neuronal attributes of neurons 11 of a core 10. Each subset 612 may be divided into multiple entries 611, wherein each entry 611 maintains neuronal attributes for a neuron 11. For each entry 611, the neuronal attributes maintained in said entry 611 includes synaptic connectivity information, neuron parameters, and routing information. In one example implementation, the subsets 612 are organized into multiple groups 614, wherein each group 614 comprises multiple subsets 612 representing different cores 10.

In general, the optimal height of the memory array 610 should be based on the largest possible number of neurons 11 that a circuit 120 can process within a time step. For example, if the circuit 120 operates at 100 MHz and all neurons 11 must be processed within a 1 ms time step, wherein 1000 ticks are needed to process a neuron 11, the memory array 610 can have only 100 entries 611. Determining the optimal width of the memory array 610 is process-dependent.

Figure 15:
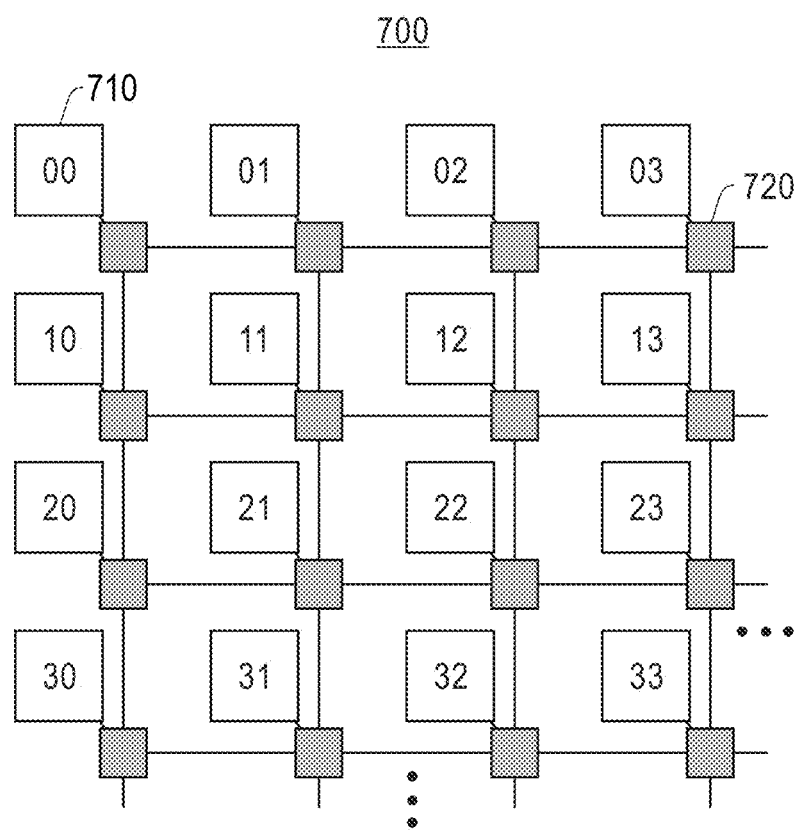
FIG. 15 illustrates a neural network, in accordance with an embodiment of the invention.

FIG. 15 illustrates a neural network 700, in accordance with an embodiment of the invention. The neural network comprises multiple neurosynaptic core circuits 710. The neurosynaptic core circuits 710 may be multiplexed cores 100, tall meta-cores 400, wide meta-cores 500, or meta-cores 600. Each core 710 has a corresponding router 720 for passing along address-event packets to neighboring routers 200 in the northbound, southbound, eastbound, and westbound directions.

Figure 16:
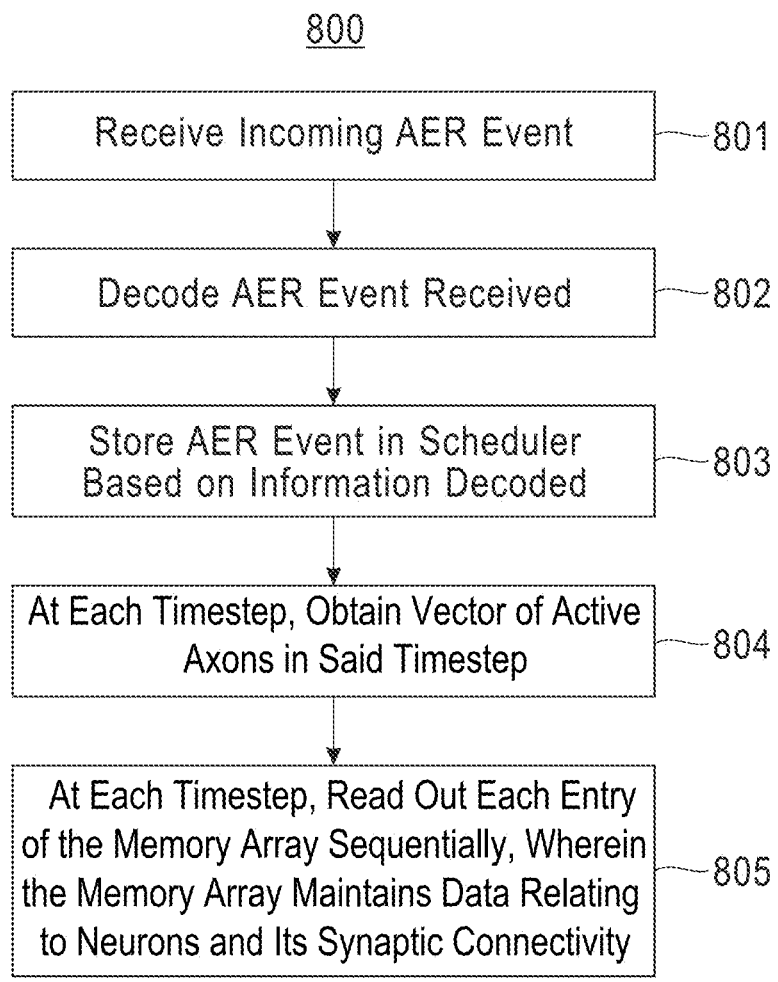
FIG. 16 illustrates a flowchart of an example process for processing firing events in a multiplexed core, in accordance with an embodiment of the invention.

FIG. 16 illustrates a flowchart of an example process 800 for processing firing events in a multiplexed core, in accordance with an embodiment of the invention. In process block 801, address-event packets (AER events) are received. In process block 802, each address-event packet received is decoded. In process block 803, decoded address-event packets are stored in a scheduler based on the information decoded. Process blocks 804 and 805 are repeated during each time step. In process block 804, a vector of active axons in the current time step is obtained from the scheduler. In process block 805, each entry of a memory array is read out sequentially, wherein the memory array maintains information relating to neurons.

Figure 17:
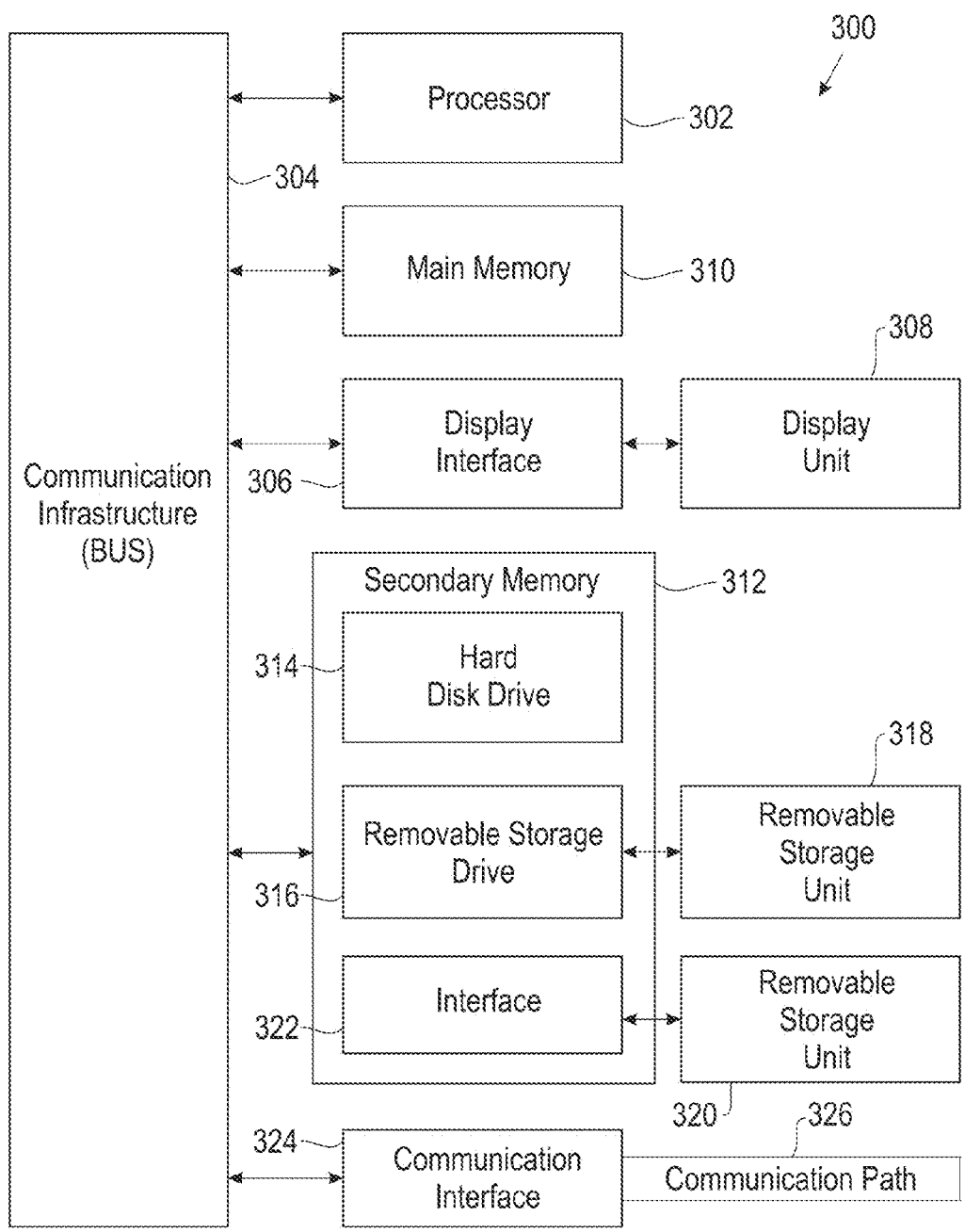
FIG. 17 is a high-level block diagram showing an information processing system useful for implementing one embodiment of the invention.

FIG. 17 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A neural network system, comprising:
a memory array that maintains information for multiple neurosynaptic core modules, wherein each neurosynaptic core module comprises multiple neurons; and
at least one logic circuit, wherein each logic circuit:
receives neuronal firing events targeting a neurosynaptic core module of the neural network system; and
integrates the firing events received based on information maintained in said memory array for said neurosynaptic core module.

2. The neural network system of claim 1, wherein:
said memory array is organized into multiple subsets, wherein each subset corresponds to a neurosynaptic core module of the neural network system; and each subset maintains neuronal attributes for neurons of a corresponding neurosynaptic core module.

3. The neural network system of claim 2, wherein:
each subset is divided into multiple entries, wherein each entry maintains neuronal attributes for a corresponding neuron; and
for each entry, the neuronal attributes maintained in said entry includes synaptic connectivity information, neuron parameters, and routing data information for a corresponding neuron.

4. The neural network system of claim 3, wherein:
each logic circuit corresponds to one or more neurosynaptic core modules of the neural network system.

5. The neural network system of claim 4, wherein:
for each logic circuit that corresponds to one or more neurosynaptic core modules of the neural network system, said logic circuit:
receives incoming neuronal firing events targeting a neuron of said one or more neurosynaptic core modules;
retrieves neuron attributes for said neuron from a corresponding entry of said memory array;
integrates the firing events received based on the neuron attributes for said neuron;
generates an outgoing neuronal firing event when the integrated firing events exceed a threshold neuron parameter for said neuron; and
updates at least one neuron attribute for said neuron.

6. The neural network system of claim 5, wherein:
each logic circuit multiplexes computation and control logic for at least two neurosynaptic core modules.

7. The neural network system of claim 6, wherein:
said memory array has multiple rows; and
each row includes at least one entry.

8. The neural network system of claim 7, wherein:
each row maintains neuronal attributes for neurons of different neurosynaptic core modules.

9. The neural network system of claim 7, wherein:
for each time step, said rows are read out sequentially.

10. The neural network system of claim 9, wherein:
said memory array is scaled in width.

11. The neural network system of claim 9, wherein:
said memory array is scaled in height.

12. A method, comprising:
maintaining information for multiple neurosynaptic core modules in a memory array, wherein each neurosynaptic core module comprises multiple neurons; and
controlling said neurosynaptic core modules using at least one logic circuit, wherein each logic circuit receives neuronal firing events targeting a neurosynaptic core module, and said logic circuit integrates the firing events received based on information maintained in said memory array for said neurosynaptic core module.

13. The method of claim 12, further comprising:
organizing said memory array into multiple subsets;
wherein each subset corresponds to a neurosynaptic core module; and
wherein each subset maintains neuronal attributes for neurons of a corresponding neurosynaptic core module.

14. The method of claim 13, further comprising:
dividing each subset into multiple entries, wherein each entry maintains neuronal attributes for a corresponding neuron;
wherein, for each entry, the neuronal attributes maintained in said entry includes synaptic connectivity information, neuron parameters, and routing data information for a corresponding neuron.

15. The method of claim 14, further comprising:
each logic circuit controlling one or more neurosynaptic core modules.

16. The method of claim 15, further comprising:
for each logic circuit controlling one or more neurosynaptic core modules, said logic circuit:
receiving incoming neuronal firing events targeting a neuron of said one or more neurosynaptic core modules;
retrieving neuron attributes for said neuron from a corresponding entry of said memory array;
integrating the firing events received based on the neuron attributes for said neuron;
generating an outgoing neuronal firing event when the integrated firing events exceed a threshold neuron parameter for said neuron; and
updating at least one neuron attribute for said neuron.

17. The method of claim 16, further comprising:
for each logic circuit, multiplexing computation and control logic for at least two neurosynaptic core modules.

18. The method of claim 17, further comprising:
scaling said memory array in width.

19. The method of claim 17, further comprising:
scaling said memory array in height.

20. A non-transitory computer program product for a neural network system comprising multiple neurosynaptic core modules, the computer program product comprising a computer-readable storage medium having program code embodied therewith, the program code being executable by a computer to:
maintain information for said neurosynaptic core modules in a memory array, wherein each neurosynaptic core module comprises multiple neurons; and
control said neurosynaptic core modules using at least one logic circuit, wherein each logic circuit receives neuronal firing events targeting a neurosynaptic core module of the neural network system, and said logic circuit integrates the firing events received based on information maintained in said memory array for said neurosynaptic core module.

21. The program code of claim 20, further executable by the computer to:
organize said memory array into multiple subsets;
wherein each subset corresponds to a neurosynaptic core module; and
wherein each subset maintains neuronal attributes for neurons of a corresponding neurosynaptic core module.

22. The program code of claim 21, further executable by the computer to:
divide each subset into multiple entries, wherein each entry maintains neuronal attributes for a corresponding neuron;
wherein, for each entry, the neuronal attributes maintained in said entry includes synaptic connectivity information, neuron parameters, and routing data information for a corresponding neuron.

23. The program code of claim 22, further executable by the computer to:
for each logic circuit, control one or more neurosynaptic core modules of the neural network system.

24. The program code of claim 23, further executable by the computer to:
for each logic circuit, multiplex computation and control logic for at least two neurosynaptic core modules.

25. The program code of claim 24, further executable by the computer to:

for each time step, read out each entry of each subset sequentially.

* * * * *